US009636827B2

(12) United States Patent
Sato (10) Patent No.: US 9,636,827 B2
(45) Date of Patent: May 2, 2017

(54) ROBOT SYSTEM FOR PERFORMING FORCE CONTROL

(71) Applicant: FANUC Corporation, Yamanashi (JP)

(72) Inventor: Takashi Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/862,249

(22) Filed: Sep. 23, 2015

(65) Prior Publication Data

US 2016/0089789 A1 Mar. 31, 2016

(30) Foreign Application Priority Data

Sep. 30, 2014 (JP) ................................. 2014-201327

(51) Int. Cl.
| | |
|---|---|
| *G05B 19/04* | (2006.01) |
| *G05B 19/18* | (2006.01) |
| *B25J 11/00* | (2006.01) |
| *B25J 13/08* | (2006.01) |

(52) U.S. Cl.
CPC ........... *B25J 11/005* (2013.01); *B25J 13/085* (2013.01); *B25J 13/088* (2013.01); *Y10S 901/09* (2013.01)

(58) Field of Classification Search
CPC ...... B25J 11/005; B25J 13/088; B25J 13/085; Y10S 901/09
USPC ......................................................... 700/254
See application file for complete search history.

(56) References Cited

U.S. PATENT DOCUMENTS

| | | | | |
|---|---|---|---|---|
| 4,967,127 A | * | 10/1990 | Ishiguro ................. | B25J 13/085 318/570 |
| 5,448,146 A | | 9/1995 | Erlbacher | |
| 5,740,081 A | * | 4/1998 | Suzuki ............... | G05B 19/4015 700/159 |
| 2004/0180606 A1 | * | 9/2004 | Iwashita ................... | H02P 5/52 451/5 |
| 2006/0039768 A1 | * | 2/2006 | Ban ..................... | G05B 19/4163 409/96 |
| 2007/0210740 A1 | * | 9/2007 | Sato ........................ | B25J 9/1633 318/646 |

(Continued)

FOREIGN PATENT DOCUMENTS

| | | |
|---|---|---|
| CN | 101034283 A | 9/2007 |
| CN | 101239467 A | 8/2008 |

(Continued)

*Primary Examiner* — Harry Oh
(74) *Attorney, Agent, or Firm* — Hauptman Ham, LLP (57) ABSTRACT

A robot system includes a robot that operates to move a machining tool relative to a workpiece, an actuator that changes a position of the machining tool, and a control device that controls the robot. The control device includes a robot control unit that operates the robot along a predetermined motion trajectory, a force detection unit that detects force acting between the machining tool and the workpiece, a position detection unit that detects a current position of the machining tool, a force control unit that obtains a target position of the machining tool such that a detection value of the force detection unit approaches a predetermined value, and a position correction unit that calculates a position correction amount of a motion trajectory of the robot and a position correction amount of the actuator in response to the target position of the machining tool.

9 Claims, 8 Drawing Sheets

(56) References Cited

U.S. PATENT DOCUMENTS

| | | | | |
|---|---|---|---|---|
| 2008/0140257 A1* | 6/2008 | Sato | ................ | B25J 9/1633 |
| | | | | 700/258 |
| 2013/0184868 A1* | 7/2013 | Inazumi | ................ | B25J 9/1633 |
| | | | | 700/258 |
| 2013/0338832 A1* | 12/2013 | Sato | ................ | B25J 9/1633 |
| | | | | 700/260 |

FOREIGN PATENT DOCUMENTS

| | | |
|---|---|---|
| CN | 103429400 A | 12/2013 |
| DE | 102011006679 A1 | 9/2012 |
| JP | S60-155356 A | 8/1985 |
| JP | H02-015956 A | 1/1990 |
| JP | H06-226671 A | 8/1994 |
| JP | H08-087336 A | 4/1996 |
| JP | 2001-219354 A | 8/2001 |
| JP | 2009-172692 A | 8/2009 |
| JP | 2011-041992 A | 3/2011 |
| JP | 2014-508051 A | 4/2014 |

* cited by examiner

ROBOT SYSTEM FOR PERFORMING FORCE CONTROL

RELATED APPLICATIONS

The present application claims priority to Japanese Application Number 2014-201327, filed Sep. 30, 2014, the disclosure of which is hereby incorporated by reference herein in its entirety.

BACKGROUND OF THE INVENTION

1. Field of the Invention

The present invention relates to a robot system that performs a machining process on the workpiece by moving a machining tool and a workpiece relative to each other while pressing the machining tool against the workpiece with predetermined force.

2. Description of the Related Art

Known robot systems perform grinding or deburring of a work by using a robot. In such robot systems, the robot is moved while pressing a machining tool (a grinder, a sanding machine and the like) mounted at the wrist of the robot against the surface of the workpiece positioned in a movable range of the robot. Alternatively, the workpiece is held by the robot, and the robot is moved while pressing the workpiece against the machining tool fixed in the movable range of the robot. Meanwhile, an error may occur in the positioning of the workpiece or a holding position of the workpiece by the robot. Alternatively, an error may occur in a positional relation between the machining tool and the workpiece due to an individual difference of the workpiece, the wearing of the machining tool and the like. In order to prevent machining quality from deteriorating due to such an error, various methods are proposed.

JP2009-172692A discloses a method for teaching a motion trajectory of a robot which is provided with a compliance mechanism between a robot wrist and a grinding or deburring tool, so as to bring the tool into contact with a workpiece. According to the known art, even if there is an error in the positioning of the workpiece, an error in the holding position, or an individual difference in the shape or dimensions of the workpiece, it is still possible to absorb the error and appropriately perform the grinding or deburring of the workpiece, as long as the error is within a stroke range of the compliance mechanism.

U.S. Pat. No. 5,448,146 and JPH06-226671A disclose a method for teaching a motion trajectory of a robot which is provided with a force control mechanism including an actuator between a robot wrist and a grinding or deburring tool, so as to bring the tool into contact with a workpiece. According to the known art, even if there is an error in the positioning of the workpiece, an error in the holding position, or an individual difference in the shape or dimensions of the workpiece, contact force between the tool and the workpiece is controlled to be constant. Therefore, as long as the error is within a stroke range of the force control mechanism, it is possible to absorb the error caused by various factors.

JPS60-155356A and JPH08-087336A disclose a method for teaching a motion trajectory of a robot which is provided with a force sensor between a robot wrist and a grinding or deburring tool, so as to bring the tool into contact with a workpiece. According to the known art, force control is performed in a known manner, such as impedance control or hybrid control, and the robot is controlled such that contact force between the tool and the workpiece remains constant. According to the known art, it is possible to press the tool against the workpiece with predetermined force from any direction. Since a movable range of the robot is large, it is theoretically possible to absorb a large amount of errors.

JPH02-015956A discloses a method for teaching a motion trajectory of a robot which is provided with a compliance mechanism at a wrist, so as to bring a grinding or deburring tool into contact with a workpiece. According to the known art, reaction force received by the tool from the workpiece is measured, and the robot trajectory is corrected in real time such that the reaction force is a predetermined value.

JP2011-041992A discloses a method for adjusting, in a robot system provided with a force sensor and a hydraulic cylinder device, at least one of a target speed and a target track of a robot, target thrust of a hydraulic cylinder device, and a target motion speed of a machining tool in accordance with detection data of the force sensor.

In the method disclosed in JP2009-172692A, in the case in which a flexible unit is included in the compliance mechanism, the compliance mechanism is deformed due to gravity when the compliance mechanism is oriented in a horizontal direction or inclined with respect to a vertical direction. As a result, it is no longer possible to absorb the error in the positioning or undue pressing force may be generated. Furthermore, if the sum of the positioning error or the individual difference of the workpiece is larger than the stroke of the compliance mechanism, it is not possible to absorb the error. In the case where the compliance mechanism includes a spring, since the size of the positioning error and the pressing force are proportional to each other, the pressing force is changed from one place to another. Therefore, it cannot be ensured that machining quality is constant.

In the method disclosed in U.S. Pat. No. 5,448,146 and JPH06-226671A, even if the force control mechanism is oriented in the horizontal direction or is inclined with respect to the vertical direction, the mechanism unit is not deformed. However, similarly to the method disclosed in JP2009-172692A, it is not possible to absorb an error larger than the stroke of the compliance mechanism.

In the method disclosed in JPS60-155356A and JPH08-087336A, in which the pressing force is controlled through the operation of the robot body, responsiveness of the force control is affected by mass, inertia and rigidity of the robot body, and performance of an actuator for driving the robot, and the like. In general, as mass and inertia of the mechanism is larger, the responsiveness tends to be decreased. Accordingly, a large robot results in decreased responsiveness of the force control, and it may not be possible to achieve required machining quality. Similarly, also according to the method disclosed in JPH02-015956A, responsiveness of pressing force control is affected by mass, inertia and rigidity of the robot body and performance of an actuator for driving the robot, and the like.

According to the method disclosed in JP2011-041992A, in which a displacement amount of the hydraulic cylinder device is measured, when the position of the hydraulic cylinder device reaches a mechanical upper limit, the target track of the robot is revised. Therefore, it is also possible to absorb an error larger than the stroke of the hydraulic cylinder device. However, the track of the robot is revised only when the stroke reaches the upper limit. Therefore, there is a risk that the tool and the workpiece are temporarily not in contact with each other, or undue pressing force may be generated.

Thus, there is a need for a robot system which allows a machining process, such as deburring and grinding, to be appropriately performed, even if there is a positioning error, or an individual difference in the shape or dimensions of a workpiece.

SUMMARY OF THE INVENTION

According to a first aspect of the present invention, there is provided a robot system which performs a machining process for a workpiece by using a machining tool, comprising: a robot that holds at least one of the machining tool and the workpiece and operates such that the machining tool and the workpiece are moved relative to each other; an actuator with one or more degrees of freedom, which is mounted with the machining tool or the workpiece and changes a position of an acting point of the machining tool or the workpiece in cooperation with the robot; and a control device that controls an operation of the robot, wherein the control device comprises: a robot control unit that operates the robot along a predetermined motion trajectory; a force detection unit that detects force acting between the machining tool and the workpiece; a position detection unit that detects a current position of the acting point of the machining tool or the workpiece mounted on the actuator; a force control unit that obtains a target position of the acting point of the machining tool or the workpiece mounted on the actuator such that the force detected by the force detection unit approaches a predetermined value; and a position correction unit that calculates a position correction amount of a motion trajectory of the robot and a position correction amount of the actuator in response to the target position of the acting point of the machining tool or the workpiece.

According to a second aspect of the present invention, in the robot system according to the first aspect, the actuator and a position sensor for detecting a position of the actuator are provided at a wrist unit of the robot, and the workpiece is arranged within a movable range of the robot.

According to a third aspect of the present invention, in the robot system according to the first aspect, the robot is configured to hold the workpiece, and the actuator and a position sensor for detecting a position of the actuator are fixed at a predetermined position within a movable range of the robot.

According to a fourth aspect of the present invention, in the robot system according to the first aspect, the actuator and a position sensor for detecting a position of the actuator are provided at a wrist unit of the robot, and the machining tool is fixed at a predetermined position within a movable range of the robot.

According to a fifth aspect of the present invention, in the robot system according to the first aspect, the machining tool is mounted on a wrist unit of the robot, and the actuator and a position sensor for detecting a position of the actuator are fixed at a predetermined position within a movable range of the robot.

According to a sixth aspect of the present invention, in the robot system according to any one of the first to fifth aspects, the position correction amount of the motion trajectory of the robot, which is calculated by the position correction unit for each unit time, is limited to be equal to or less than a predetermined value.

According to a seventh aspect of the present invention, in the robot system according to any one of the first to sixth aspects, the control device further comprises an execution unit that performs at least one of stopping the robot with an alarm and recording at least one of current position and posture of the robot and a current position of the actuator when the actuator reaches an upper limit value or a lower limit value of a movable range of the actuator.

According to an eighth aspect of the present invention, in the robot system according to any one of the first to seventh aspects, the control device further comprises a replacement unit that replaces the motion trajectory of the robot with a motion trajectory of the robot corrected according to the position correction amount calculated by the position correction unit.

According to a ninth aspect of the present invention, in the robot system according to any one of the first to eighth aspect, a force sensor for detecting the force acting between the machining tool and the workpiece is mounted on the wrist unit of the robot.

According to a tenth aspect of the present invention, in the robot system according to any one of the first to eighth aspects, a force sensor for detecting the force acting between the machining tool and the workpiece is fixed at a predetermined position within the movable range of the robot.

These and other objects, features and advantages of the present invention will become more apparent in light of the detailed description of exemplary embodiments thereof as illustrated in the drawings.

DETAILED DESCRIPTION

Hereinafter, with reference to the accompanying drawings, embodiments of the present invention will be described. Scales of the illustrated elements are changed as necessary in order to facilitate the understanding of the present invention. The same reference numerals are used to designate the same elements or corresponding elements.

Figure 1:
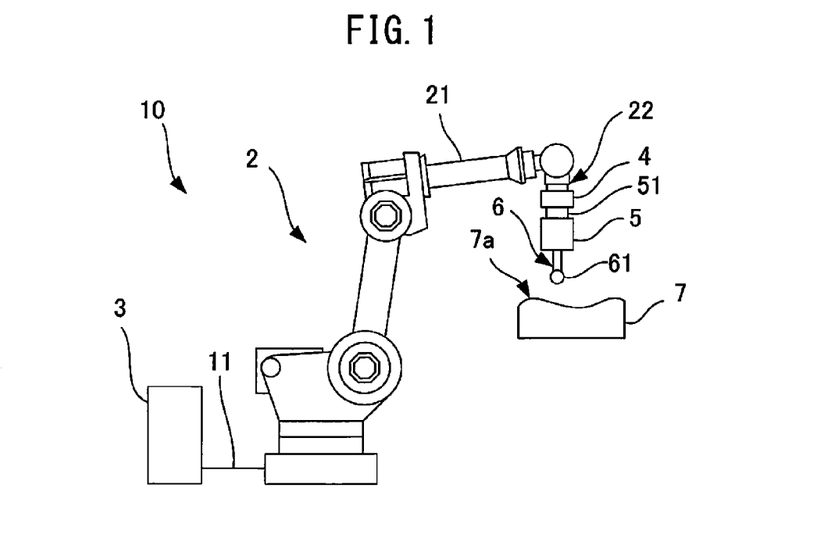
FIG. 1 is a diagram illustrating a schematic configuration of a robot system according to one embodiment.

FIG. 1 illustrates a schematic configuration of a robot system according to one embodiment. A robot system 10 uses a robot 2 to perform a machining process such as deburring or grinding on a workpiece 7. The robot 2 is, for example, a 6-axis articulated robot as illustrated in the drawing. Any known robot 2 having other configurations may also be used. The robot 2 is configured to be able to change its position and posture according to a control command transmitted from a control device 3 via a known communication means such as a communication cable 11.

A wrist unit 22 provided at a tip of an arm 21 of the robot 2 is mounted with a force sensor 4, an actuator 5, and a machining tool 6. The force sensor 4 provided between the actuator 5 and the wrist unit 22 detects external force acting on the machining tool 6. The force sensor 4 is configured to detect reaction force acting on the machining tool 6 pressed against the workpiece 7, when the workpiece 7 is machined. The machining tool 6 is, for example, a known tool used for machining such as deburring and grinding, namely, a grinder, a sander and the like.

The actuator 5 is mounted with the machining tool 6 at an end on the opposite side of the wrist unit 22. The actuator 5 has one or more degrees of freedom separately from a motion mechanism of the robot 2. The actuator 5 is, for example, designed to receive power from a servo motor, a pneumatic cylinder, a hydraulic cylinder and the like. For example, when the actuator 5 is driven by a servo motor, rotational motion is converted into linear motion via a ball screw or the like. The actuator 5 is configured to operate according to force control by a force control unit 33 to be described below and adjust the acting point 61 of the machining tool 6. The acting point 61 of the machining tool 6 is a point at which the machining tool 6 is in contact with the workpiece 7 in a machining process.

The actuator 5 includes a position sensor 51 that detects the position of the actuator 5. On the basis of the position of the actuator 5 detected by the position sensor 51, the position of the acting point 61 of the machining tool 6 is calculated. The position sensor 51, for example, includes a pulse encoder, a resolver, a linear scale or the like.

Figure 3:
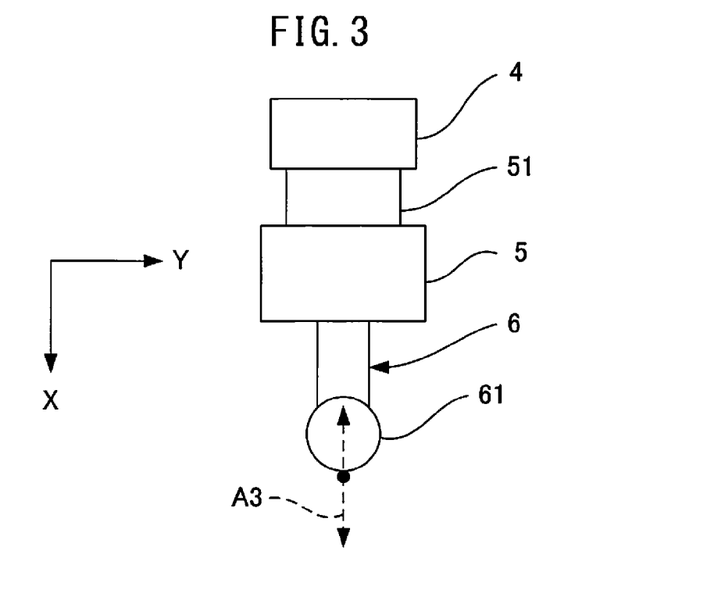
FIG. 3 is a diagram illustrating a schematic configuration of a machining tool provided with an actuator with one degree of freedom.

FIG. 3 illustrates an exemplary configuration of the actuator 5 that moves the machining tool 6. The illustrated actuator 5 has one degree of freedom and can move the machining tool 6 in a direction indicated by an arrow A3 (a direction parallel to an X-axis). When the workpiece 7 is machined, the acting point 61 of the machining tool 6 is moved by the actuator 5 toward a target position, at which pressing force against the workpiece 7 is a predetermined value. A movable range of the acting point 61 of the machining tool 6 by the actuator 5 depends on the length of a ball screw in the actuator 5, a movable range of a cylinder, or the like.

Figure 4:
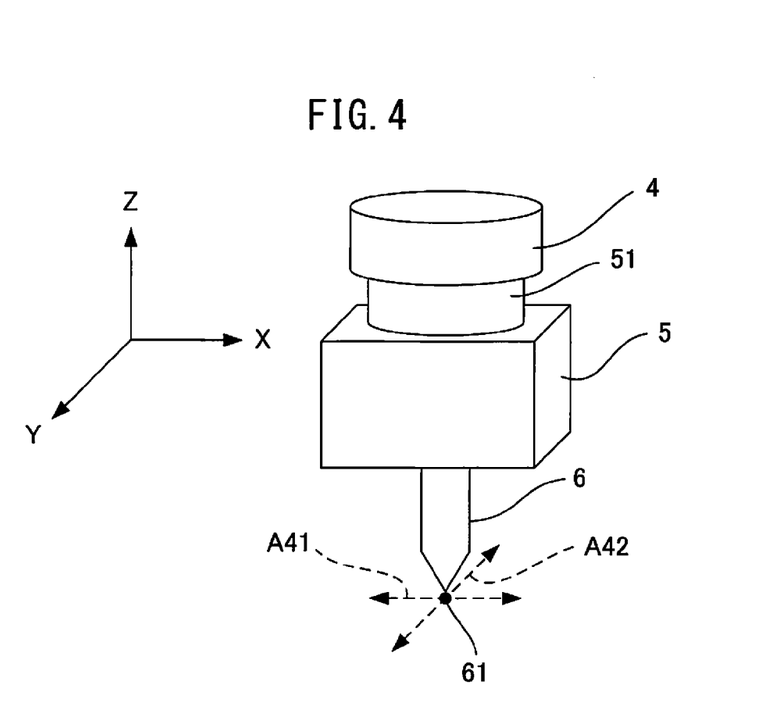
FIG. 4 is a diagram illustrating a schematic configuration of a machining tool provided with an actuator with two degrees of freedom.

FIG. 4 illustrates another exemplary configuration of the actuator 5 that moves the machining tool 6. The illustrated actuator 5 has two degrees of freedom and can move the machining tool 6 in directions indicated by arrows A41 and A42 (directions parallel to the X-axis and Y-axis, respectively). In this case, the actuator 5 operates according to force control in each of the X-axis and the Y-axis, so that the machining tool 6 is moved toward a target position at which force acting between the machining tool 6 and the workpiece 7 on an X-Y plane reaches a predetermined value. A movable range of the acting point 61 of the machining tool 6 on the X-Y plane depends on the length of a ball screw of the actuator 5, a movable range of a cylinder, or the like.

The workpiece 7 is positioned at a predetermined position within the movable range of the robot 2. Alternatively, the workpiece 7 may also be provided at an unknown position within the movable range of the robot 2. The robot system 10 changes the position and posture of the robot 2 to machine the workpiece 7 by moving the machining tool 6 along a portion on a surface 7a of the workpiece 7 at which a burr has been formed, or along a portion to be grinded while pressing the machining tool 6 against the workpiece 7 with predetermined force.

The control device 3 is a digital computer having a hardware configuration including CPU, ROM, RAM, and an interface that transmits/receives signals and data to/from an external device such as an input device and a display device. The control device 3 performs various functions, which will be described later, with a predetermined control cycle.

Figure 2:
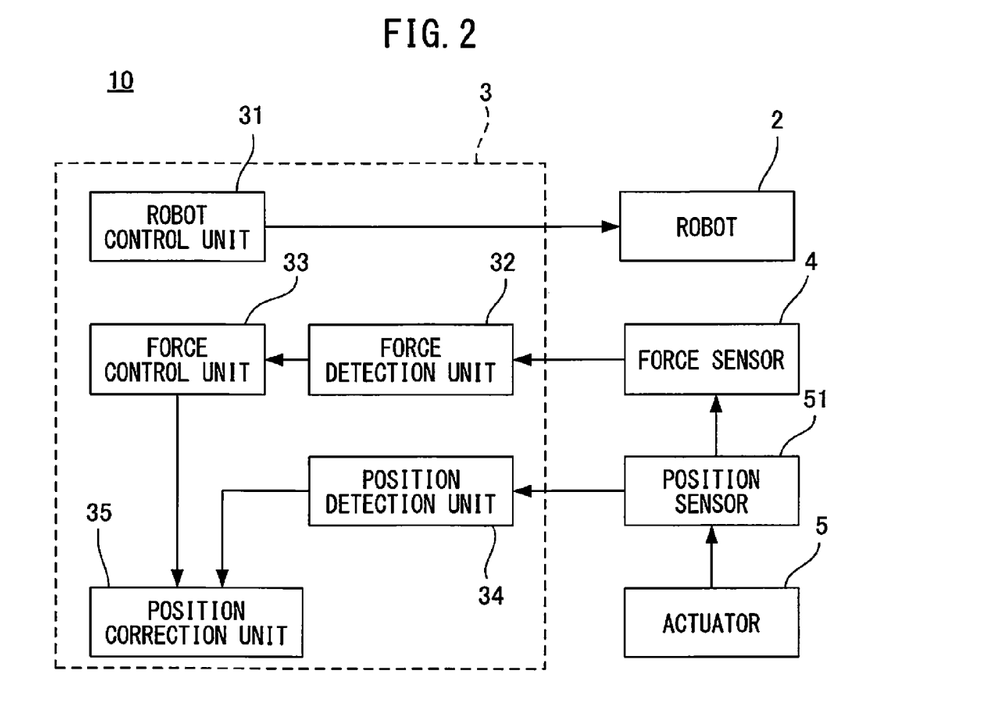
FIG. 2 is a functional block diagram of a robot system according to one embodiment.

FIG. 2 is a functional block diagram of the robot system 10. As illustrated in FIG. 2, the control device 3 includes a robot control unit 31, a force detection unit 32, a force control unit 33, a position detection unit 34, and a position correction unit 35.

The robot control unit 31 generates a control command for the robot 2 such that the acting point 61 of the machining tool 6 provided at the wrist unit 22 of the robot 2 moves along a predetermined motion trajectory. In response to the control command generated by the robot control unit 31, a driving current is supplied to a servo motor provided at each joint of the robot 2.

The force detection unit 32 detects force acting between the machining tool 6 and the workpiece 7 by the force sensor 4 provided at the wrist unit 22 of the robot 2. The force sensor 4 is, for example, a sensor using a strain gauge, a sensor for detecting a change in capacitance to obtain force, a sensor for optically detecting strain. The force sensor 4 may be any known force sensor and is not limited in any way with respect to the detection principle. The force sensor 4 may be a sensor capable of detecting force in one direction, or a sensor that detects force in two directions or three directions perpendicular to each other, if necessary.

The force control unit 33 controls the position of the actuator 5 such that the force acting between the machining tool 6 and the workpiece 7 approaches a predetermined value. The force control unit 33, for example, performs force control by using impedance control, damping control, stiffness control, hybrid control or the like. Responsiveness of the force control depends on a performance of the actuator 5 and a control device thereof, the magnitude of a load on the actuator 5, and the like. In the present embodiment, the load on the actuator 5 is mainly due to the machining tool 6 and an attachment part of the machining tool 6 and is relatively small. Accordingly, the actuator 5 has good responsiveness with respect to the force control. A control device that controls the actuator 5 may also be provided separately from the control device 3 that controls the robot 2. In this case, some functions of the force control unit 33 and the position correction unit 35 to be described below are provided in a computer separate from the control device 3.

The position detection unit 34 detects the position of the actuator 5 from the position sensor 51 provided at the actuator 5. The position detection unit 34 can further obtain the acting point 61 of the machining tool 6 from the position of the actuator by calculation.

Next, a scheme in which the robot 2 and the actuator 5 are digitally controlled will be described.

On the basis of the impedance control, the force control is performed with a constant control cycle $\Delta t$ such that the following Equation 1 is satisfied. It should be noted that the actuator 5 is an actuator having one degree of freedom illustrated in FIG. 3 by way of example, and a movement direction of the actuator 5 is an X-axis direction in a coordinate system defined with respect to the position sensor 51.

$$M \times (\ddot{x} - \ddot{x}d) + D \times (\dot{x} - \dot{x}d) + K \times (x - xd) = fdx - fx \quad \text{Equation 1}$$

M: the mass coefficient
D: the damper coefficient
K: the spring coefficient
x: the actual position of the acting point of the machining tool in X-axis direction
$\dot{x}$: the actual speed of the acting point of the machining tool in X-axis direction
xd: the preset position of the acting point of the machining tool in X-axis direction
$\dot{x}d$: the preset speed of the acting point of the machining tool in X-axis direction
$\ddot{x}d$: the preset acceleration of the acting point of the machining tool in X-axis direction
fx: the force in X-axis direction detected by the force detection unit
fxd: the target force value in X-axis direction In the Equation 1, the mass coefficient, the damper coefficient, the spring coefficient, the preset position, the preset speed, and the preset acceleration of the machining tool 6, and the target force value are preset values input by an operator. The actual position of the acting point 61 of the machining tool 6 is an output value of the position detection unit 34. The actual speed of the acting point 61 of the machining tool 6 is, for example, obtained from a difference in output values of the position detection unit 34.

From the Equation 1, the following Equation 2 is obtained to determine the target acceleration of the acting point 61 of the machining tool 6.

$$\ddot{x} = \ddot{x}d + (fd - f + D \times (\dot{x}d - \dot{x}) + K \times (xd - x))/M \quad \text{Equation 2}$$

$\ddot{x}$: the target acceleration of the acting point of the machining tool

By performing second-order integration on the right side of Equation 2, the target position of the acting point 61 of the machining tool 6 is obtained. If it is assumed that the value of the right side of Equation 2 is constant during a control cycle Δt, the target position after Δt is expressed by the following Equation 3:

$$\int \int (\ddot{x}d + (fd - f + D \times (\dot{x}d - \dot{x}) + K \times (xd - x))/M) dt dt =$$
$$\int (v0 + (\ddot{x}d + (fd - f + D \times (\dot{x}d - \dot{x}) + K \times (xd - x))/M) \times t)$$
$$dt = x0 + v0 \times \Delta t + 0.5 \times$$
$$(\ddot{x}d + (fd - f + D \times (\dot{x}d - \dot{x}) + K \times (xd - x))/M) \times \Delta t^2 \quad \text{Equation 3}$$

x0: the current position of the acting point of the machining tool
v0: the current speed of the acting point of the machining tool The current position of the acting point 61 of the machining tool 6 is an output value of the position detection unit 34. The current speed of the acting point 61 of the machining tool 6 is calculated from the difference of the output values of the position detection unit 34.

In the case where the actuator with two degrees of freedom as described with reference to FIG. 4 is used, two versions of Equation 1 are independently obtained with respect to an X-axis direction and a Y-axis direction in a coordinate system of the position sensor 51 (in the case of the Y-axis direction, "x" in Equation 1 is replaced with "y"). Similarly to the actuator with one degree of freedom, the target positions of the acting point 61 of the machining tool 6 are obtained from Equation 3 with respect to the X-axis direction and the Y-axis direction, respectively.

Figure 5A:
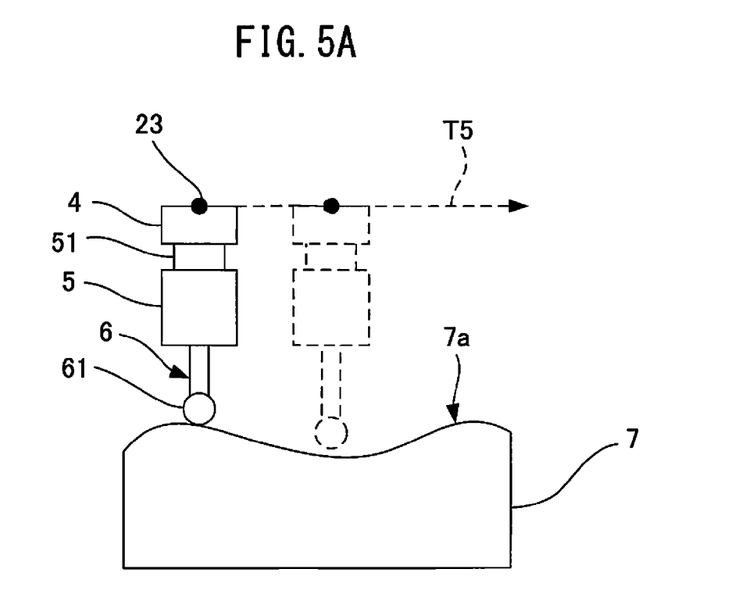
FIG. 5A is a diagram illustrating a machining tool that moves along a motion trajectory of a robot.

The position correction unit 35 calculates a position correction amount of the actuator 5 according to the target position of the acting point 61 of the machining tool 6 obtained by the force control unit 33. The stroke of the acting point 61 of the machining tool 6 controlled by the force control unit 33 depends on the length of the ball screw of the actuator 5, a movable range of a cylinder, or the like. FIG. 5A illustrates the machining tool 6 when the robot 2 is moved along a linear motion trajectory T5. The robot 2 is controlled, for example, such that a reference point 23 set at a tip of the wrist unit 22 is moved along the motion trajectory T5. The motion trajectory of the robot 2 is not limited to the linear motion trajectory T5 illustrated by way of example, and is set in consideration of the shape of the surface 7a of the workpiece 7 and the like, such that the machining can be completed within the movable range of the actuator 5. Therefore, the motion trajectory may also be curved along the shape of the surface 7a of the workpiece 7.

When the positioning error of the workpiece 7 is beyond an expected range, or the shape of the workpiece 7 is unknown or an individual difference in the shape or dimensions of the workpiece 7 is large, the target position of the acting point 61 may also deviate from the movable range of the actuator 5 during force control. In this case, as indicated by a dashed line in FIG. 5A, the acting point 61 of the machining tool 6 cannot reach the surface 7a of the workpiece 7, and thus the force control cannot be performed. On the other hand, the machining tool 6 may come too close to the workpiece 7, so that undue pressing force may act between the machining tool 6 and the workpiece 7.

Figure 5B:
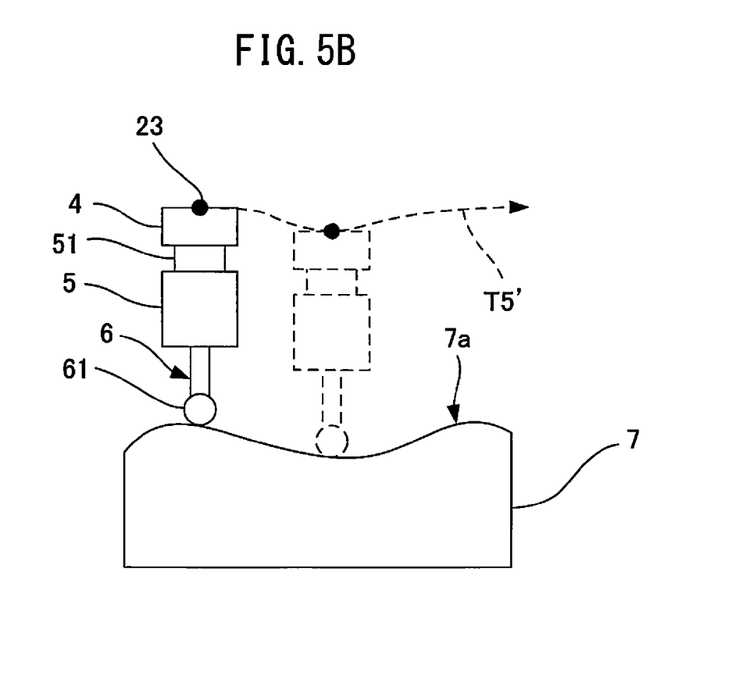
FIG. 5B is a diagram illustrating a machining tool that moves along a motion trajectory of a robot.

Therefore, when the target position of the acting point 61 of the machining tool 6 obtained in the aforementioned Equation 3 deviates from a predetermined range corresponding to the movable range of the actuator 5, the position correction unit 35 performs position correction of the motion trajectory of the robot 2, in addition to position correction of the actuator 5 based on the force control unit 33. Specifically, the position correction unit 35 automatically corrects the motion trajectory of the robot 2, and calculates the position correction amount of the robot 2, in addition to the position correction amount of the actuator 5. In this way, the target position obtained in Equation 3 is realized. FIG. 5B illustrates a motion trajectory T5' subjected to the position correction by the position correction unit 35. In the position indicated by a dashed line, the motion trajectory T5' of the robot 2 has been corrected so as to move toward the workpiece 7. Consequently, within the movable range of the actuator 5, it is possible to press the machining tool 6 to the workpiece 7 by predetermined pressing force.

The following method may be employed as a method for realizing the target position Pt of the acting point 61 of the machining tool 6 obtained in Equation 3 within the movable range of the actuator 5. The actuator 5 with one degree of freedom described with reference to FIG. 3 will be described by way of example. However, in the case of the actuator with two degrees of freedom, similar calculations are performed with respect to an X-axis direction and a Y-axis direction, respectively. For example, when "Pt>Pm+Pr" is satisfied, the position correction unit 35 corrects the target position of the acting point 61 of the machining tool 6 to (Pt−Pc). Pm is the position of the acting point 61 of the machining tool 6 when the actuator 5 is positioned at the center of its movable range. Pr is preset such that both Pm+Pr and Pm−Pr are included within the movable range of the actuator 5. Pr is, for example, a value equal to or more than zero and equal to or less than a half of the stroke of the actuator 5. However, Pr is preferably set to a value sufficiently smaller than the half of the stroke so as not to deviate from the movable range of the actuator 5 during a machining process. The target position Pt is a value described in the coordinate system of the position sensor 51. Moreover, the position correction unit 35 corrects the motion trajectory of the robot 2 by an amount of Pc in the X-axis direction (a movement direction of the actuator 5) in the coordinate system of the position sensor 51. Pc is a fixed value, and for example, may also be set, depending on the type of a robot. Furthermore, as Pt approaches a limit of the movable range, Pc may also be set to be larger.

When Pt<Pm−Pr is satisfied, the position correction unit 35 corrects the target position of the acting point 61 of the machining tool 6 to (Pt+Pc) and corrects the motion trajectory of the robot 2 in the X-axis direction in the coordinate system of the position sensor, by an amount of −Pc.

In order for the robot 2 to smoothly operate, an upper limit may be applied to the position correction amount Pc for the motion trajectory of the robot 2 in one control cycle Δt. In this case, when the position correction amount Pc exceeds a predetermined upper limit value, the position correction amount Pc is replaced with the upper limit value. Alternatively, the position correction amount Pc may also be replaced with an adjusted value Pc' through a low pass filter and the like. Alternatively, a position correction amount in one control cycle Δt may also be limited and position correction may also be performed over a plurality of control cycles Δt.

In the case of the actuator with two degrees of freedom as illustrated in FIG. 4, a position correction amount of the motion trajectory of the robot 2 is obtained in the Y-axis direction, independently of the X-axis direction.

Figure 6:
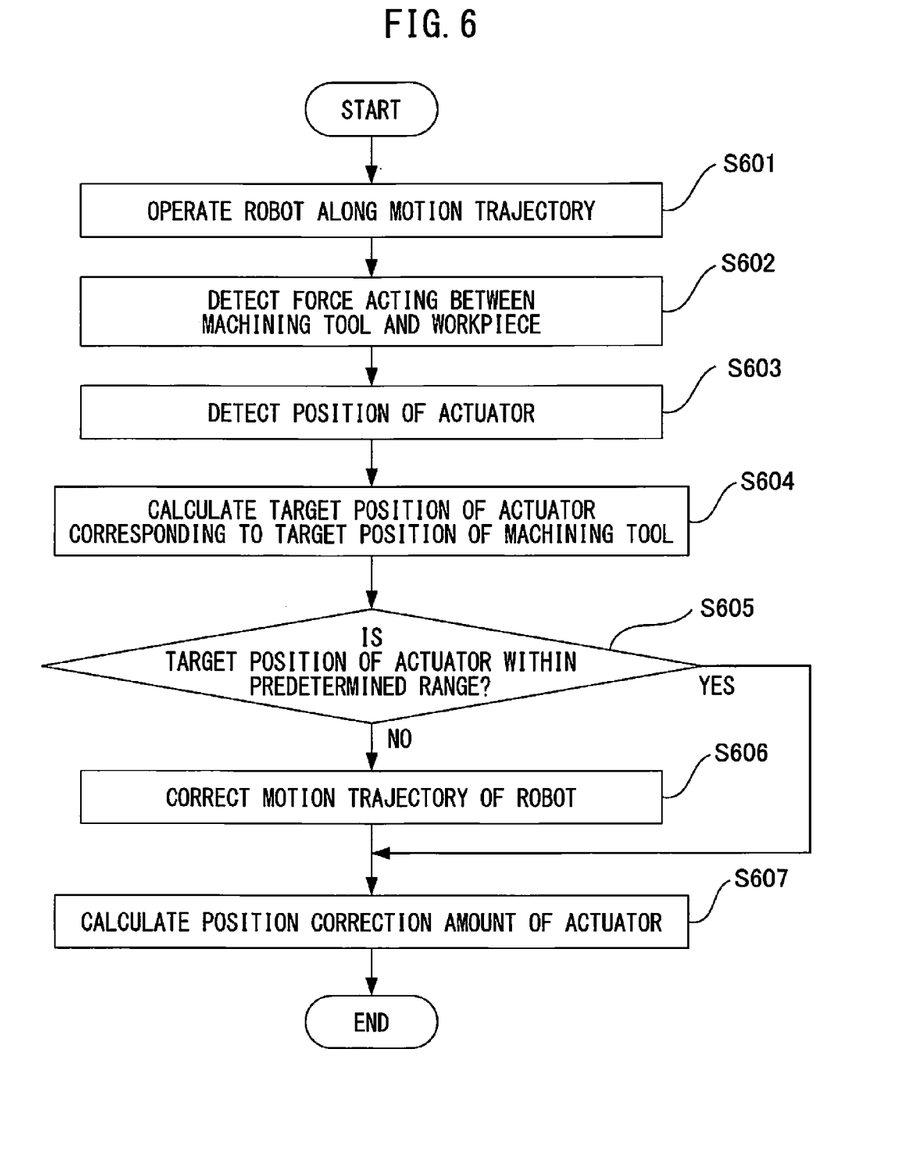
FIG. 6 is a flowchart illustrating processes performed in a robot system according to one embodiment.

With reference to FIG. 6, the flow of a procedure that is performed in the robot system 10 according to one embodiment will be described. The processes at steps S601 to S607 are performed with a predetermined control cycle Δt. When the robot system 10 starts a machining process, the robot control unit 31 moves the robot 2, at step S601, along a motion trajectory taught or designated in advance. At step S602, the force detection unit 32 detects force acting between the machining tool 6 and the workpiece 7.

Next, at step S603, the position detection unit 34 detects a current position of the actuator 5 and further calculates a current position of the acting point 61 of the machining tool 6 from the position of the actuator 5. At step S604, the force control unit 33 calculates the position of the actuator 5 and therefore the target position of the acting point 61 of the machining tool 6 according to the aforementioned Equation 3 such that the force acquired at step S602 approaches predetermined pressing force. Moreover, the force control unit 33 calculates a target position of the actuator 5 corresponding to the target position of the acting point 61 of the machining tool 6.

At step S605, it is determined whether or not the target position of the actuator 5 obtained at step S604 is within a range determined in advance on the basis of the movable range of the actuator 5. The range used in the determination is a range having a margin to a certain degree such that it is possible to determine whether or not a change of a motion trajectory is needed before reaching the limit of the movable range of the actuator 5, as described above.

In the case where the result of the determination at step S605 is negative, the movable range of the actuator 5 may be exceeded before the acting point 61 of the machining tool 6 reaches a target position. Therefore, at step S606, in order to appropriately perform force control, the position correction unit 35 calculates a position correction amount for changing the motion trajectory of the robot 2 such that the machining tool 6 moves closer to the workpiece 7 or away from the workpiece 7, whichever appropriate. At step S607, the position correction unit 35 calculates a position correction amount of the actuator 5, which is obtained by subtracting the position correction amount of the motion trajectory of the robot 2 obtained at step S606 from the target position of the actuator 5 obtained at step S604, such that the acting point 61 of the machining tool 6 reaches the target position.

On the other hand, in the case where the result of the determination at step S605 is positive, it is not necessary to change the motion trajectory of the robot 2, and it can be assumed that only the actuator 5 is required to perform the force control. Consequently, Step S606 is bypassed to proceed to step S607, at which the position correction unit 35 calculates the position correction amount of the actuator 5 according to the target position of the actuator 5 obtained at step S604.

In accordance with the robot system 10 according to the present embodiment, the following advantages are obtained.

(1) When a machining process is performed according to force control, a positional relation between the machining tool 6 and the workpiece 7 can be changed by the actuator 5. Accordingly, responsiveness to the force control depends on the actuator 5, independently of the configuration of the robot 2. Load on the actuator 5 is generally small and the actuator has good responsiveness. Therefore, it is possible to provide the robot system 10 having superior responsiveness to the force control.

(2) In the case where the target position of the acting point 61 of the machining tool 6 exceeds the movable range of the actuator 5, the motion trajectory of the robot 2 is automatically changed. Accordingly, the motion trajectory of the robot 2 is not limited by the movable range of the actuator 5. Therefore, even if an error is large, it is still possible to appropriately perform a machining process.

(3) In the case where a position correction amount calculated by the position correction unit 35 exceeds a predetermined upper limit value, the position correction amount is limited to the upper limit value. Therefore, it is possible to prevent the robot 2 or the actuator 5 from rapidly moving within one control cycle Δt.

Figure 7:
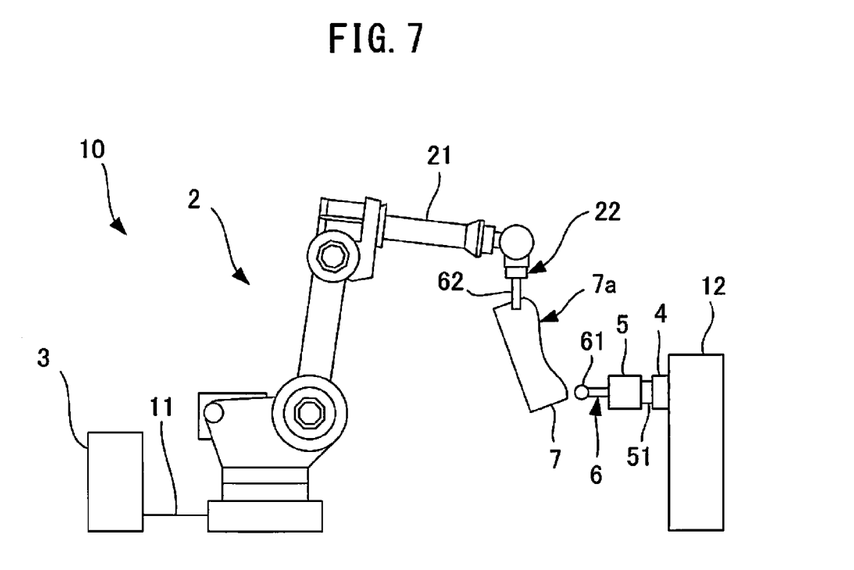
FIG. 7 is a diagram illustrating a schematic configuration of a robot system according to another embodiment.

FIG. 7 illustrates a schematic configuration of the robot system 10 according to another embodiment. In the present embodiment, the wrist unit 22 of the robot 2 is mounted with a holding tool 62 capable of holding the workpiece 7. On the other hand, the machining tool 6 is fixed in the movable range of the robot 2 via a support body 12. The robot 2 moves the workpiece 7 relative to the machining tool 6 by changing the position and posture of the robot 2 while holding the workpiece 7 by the holding tool 62. The holding tool 62 is, for example, a hand provided with claws that open and close, a suction tool that generates suction force by virtue of negative pressure, a magnetic tool that magnetically sucks the workpiece 7, or the like. Between the support body 12 and the machining tool 6, the force sensor 4, the position sensor 51, and the actuator 5 are provided. In the present embodiment, a machining process is performed by moving the acting point of the workpiece 7 and the acting point 61 of the machining tool 6 relative to each other by means of the actuator 5 and the robot 2 such that the workpiece 7 generates predetermined pressing force against the machining tool 6. The acting point of the workpiece 7 is a contact point with the machining tool 6, which is situated on the surface 7a of the workpiece 7 to be machined. The functional configuration of the control device 3 is similar to that of the aforementioned embodiment.

Figure 8:
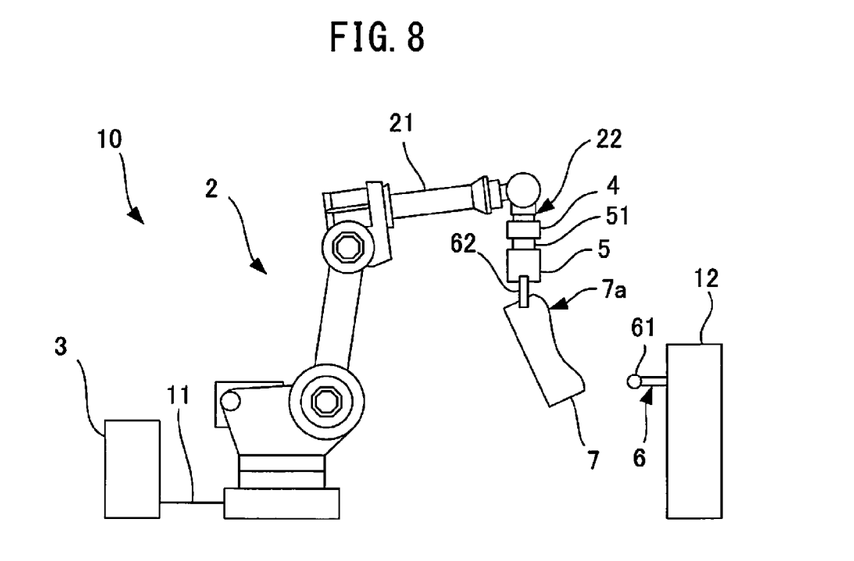
FIG. 8 is a diagram illustrating a schematic configuration of a robot system according to another embodiment.

FIG. 8 illustrates a schematic configuration of the robot system 10 according to another embodiment. In the present embodiment, the wrist unit 22 of the robot 2 is mounted with the holding tool 62 capable of holding the workpiece 7, the actuator 5, the position sensor 51, and the force sensor 4. On the other hand, the machining tool 6 is fixed within the movable range of the robot 2 via the support body 12. In the present embodiment, a machining process is performed by moving the acting point of the workpiece 7 and the acting point 61 of the machining tool 6 relative to each other by means of the actuator 5 and the robot 2 such that predetermined pressing force is generated between the workpiece 7 and the machining tool 6. The functional configuration of the control device 3 is similar to that of the aforementioned embodiment.

Figure 9:
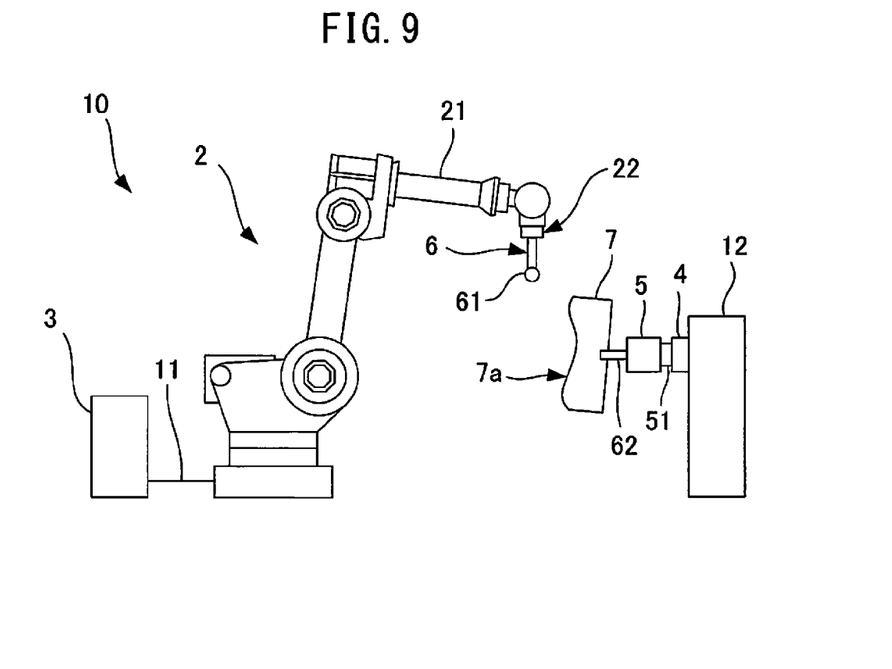
FIG. 9 is a diagram illustrating a schematic configuration of a robot system according to another embodiment.

FIG. 9 illustrates a schematic configuration of the robot system 10 according to another embodiment. In the present embodiment, the robot 2 is provided at the wrist unit 22 thereof with the machining tool 6. On the other hand, the support body 12 is provided with the force sensor 4, the position sensor 51, the actuator 5, and the holding tool 62 that is mounted on the actuator 5 and can hold the workpiece 7. In the present embodiment, the robot 2 moves the acting point 61 of the machining tool 6 and the actuator 5 moves the acting point of the workpiece 7 held by the holding tool 62 such that predetermined pressing force is generated between the workpiece 7 and the machining tool 6. The functional configuration of the control device 3 is similar to that of the aforementioned embodiment.

Figure 10:
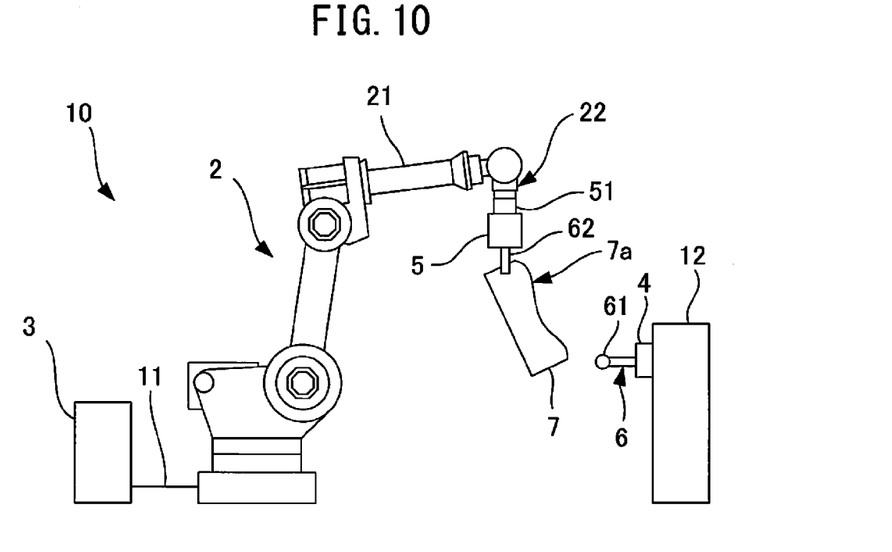
FIG. 10 is a diagram illustrating a schematic configuration of a robot system according to another embodiment.

FIG. 10 illustrates a schematic configuration of the robot system 10 according to another embodiment. In the present embodiment, the wrist unit 22 of the robot 2 is mounted with the position sensor 51, the actuator 5, and the holding tool 62. On the other hand, the force sensor 4 and the machining tool 6 are fixed to the support body 12. In the present embodiment, a machining process for the workpiece 7 is performed by moving the acting point 61 of the machining tool 6 and the acting point of the workpiece 7 relative to each other in cooperation between the robot 2 and the actuator 5. The functional configuration of the control device 3 is similar to that of the aforementioned embodiment.

Figure 11:
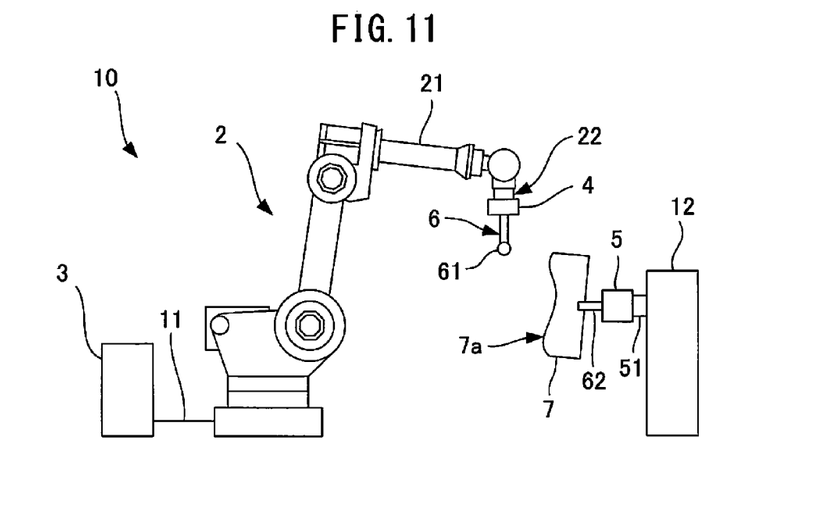
FIG. 11 is a diagram illustrating a schematic configuration of a robot system according to another embodiment.

FIG. 11 illustrates a schematic configuration of the robot system 10 according to another embodiment. In the present embodiment, the robot 2 is provided at the wrist unit 22 thereof with the force sensor 4 and the machining tool 6. On the other hand, the position sensor 51, the actuator 5, and the holding tool 62 are fixed to the support body 12. In the present embodiment, a machining process for the workpiece 7 is performed by moving the acting point 61 of the machining tool 6 and the acting point of the workpiece 7 relative to each other in cooperation between the robot 2 and the actuator 5. The functional configuration of the control device 3 is similar to that of the aforementioned embodiment.

Figure 12:
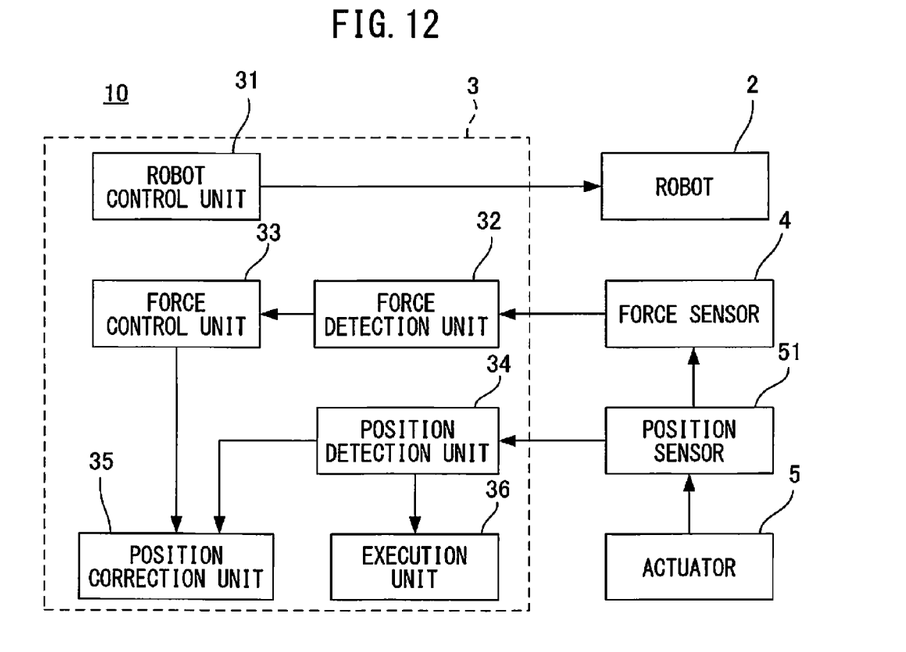
FIG. 12 is a functional block diagram of a robot system according to another embodiment.

FIG. 12 is a functional block diagram of the robot system 10 according to another embodiment. According to the present embodiment, the control device 3 further includes an execution unit 36 in addition to the configuration illustrated in FIG. 2. The execution unit 36 stops the robot 2 with an alarm when the position of the actuator 5 detected by the position sensor 51 reaches an upper limit value or a lower limit value of the movable range of the actuator 5 or sufficiently approaches the upper limit value or the lower limit value. In this case, when the actuator 5 substantially reaches the limit of the movable range, the robot system 10 can notify an operator of abnormality. For example, the operator may discard the workpiece 7 as a defective product distinctively from a qualified product, or may also perform a machining process again with changed settings.

In another embodiment, the execution unit 36 may also be configured to record at least one of a current position of the robot 2 and a current position of the actuator 5 when the actuator 5 substantially reaches the limit of the movable range. In this case, the robot system 10 can perform a machining process without the alarm stop of the robot 2, and an operator may examine a portion where abnormality occurs later on, or may also perform a machining process again by changed settings.

Figure 13:
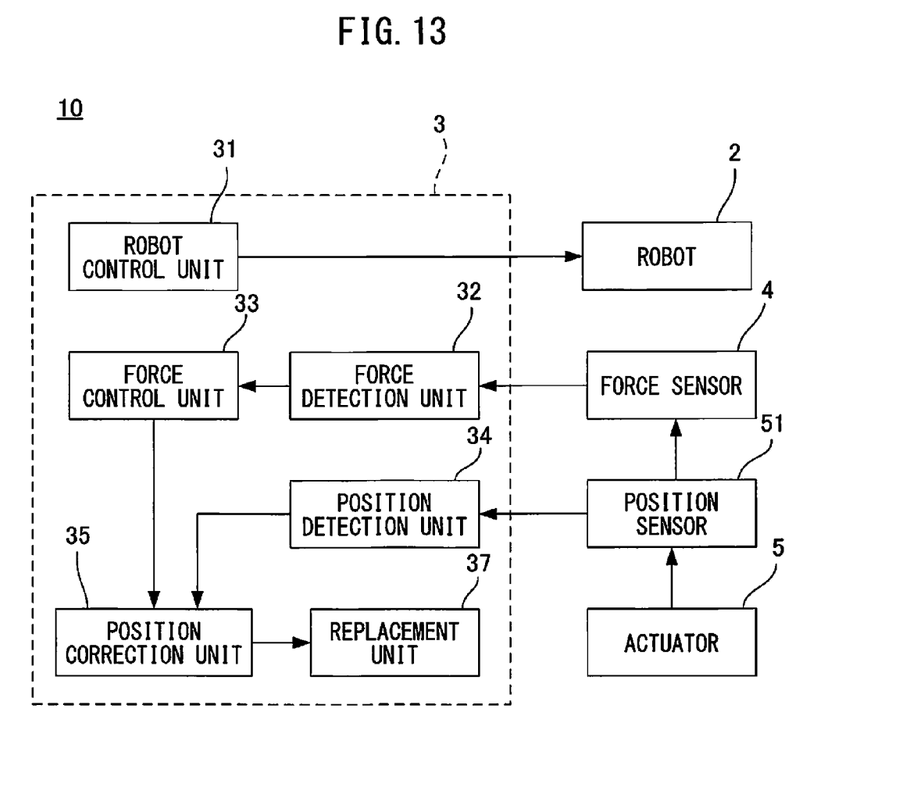
FIG. 13 is a functional block diagram of a robot system according to another embodiment.

FIG. 13 is a functional block diagram of the robot system 10 according to another embodiment. According to the present embodiment, the control device 3 further includes a replacement unit 37 in addition to the configuration illustrated in FIG. 2. The replacement unit 37 stores a motion trajectory corrected according to a position correction amount calculated by the position correction unit 35, and replaces the motion trajectory of the robot 2 used by the robot control unit 31 with the corrected motion trajectory.

For example, even in the case where there are relatively large individual differences with respect to the shape or dimensions among workpieces having different manufacturing lot numbers, workpieces having the same manufacturing lot number tend to have small individual differences. In such a case, a corrected motion trajectory of the robot, which is obtained as a result of a machining process performed for the first time after workpieces having a different manufacturing lot number is introduced, is stored as a new motion trajectory. This eliminates a need to correct the motion trajectory of the robot 2 for each workpiece 7 until workpieces having yet another manufacturing lot number is machined. Consequently, a machining process can be stabilized.

EFFECT OF THE INVENTION

According to the present invention, even if a positioning error of a workpiece is large or there is an individual difference in the shape or dimensions of the workpiece, it is possible to appropriately perform a machining process such as deburring and grinding of the workpiece. Furthermore, the responsiveness of force control depends on the performance of the actuator with one or more degrees of freedom, which is controlled independently of the robot, so that it is possible to achieve a good machining quality regardless of the configuration of the robot.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. A robot system which performs a machining process for a workpiece by using a machining tool the robot system comprising:
   a robot configured to separately hold one of the machining tool and the workpiece,
   wherein the robot holds one of the machining tool and the workpiece and operates such that the machining tool and the workpiece are moved relative to each other;
   an actuator with one or more degrees of freedom, the machining tool or the workpiece being mounted on the actuator, the actuator changing a position of an acting point of the machining tool or the workpiece in cooperation with the robot; and
   a control device that controls an operation of the robot, wherein the control device comprises:
      a robot control unit that operates the robot along a predetermined motion trajectory;
      a force detection unit that detects a force acting between the machining tool and the workpiece;
      a position detection unit that detects a current position of the acting point of the machining tool or the workpiece mounted on the actuator;
      a force control unit that obtains a target position of the acting point of the machining tool or the workpiece mounted on the actuator such that the force detected by the force detection unit approaches a predetermined force value; and
      a position correction unit that calculates a position correction amount of the predetermined motion trajectory of the robot and a position correction amount of the actuator in response to the target position of the acting point of the machining tool or the workpiece;
   wherein the position correction amount of the predetermined motion trajectory of the robot, which is calculated by the position correction unit for each unit time, is limited to be equal to or less than a predetermined position correction amount.

2. The robot system according to claim 1, wherein
   the actuator and a position sensor for detecting a position of the actuator are provided at a wrist unit of the robot, and
   the workpiece is arranged within a movable range of the robot.

3. The robot system according to claim 1, wherein
   the robot is configured to hold the workpiece, and
   the actuator and a position sensor for detecting a position of the actuator are fixed at a predetermined position within a movable range of the robot.

4. The robot system according to claim 1, wherein
   the actuator and a position sensor for detecting a position of the actuator are provided at a wrist unit of the robot, and
   the machining tool is fixed at a predetermined position within a movable range of the robot.

5. The robot system according to claim 1, wherein
   the machining tool is mounted on a wrist unit of the robot, and
   the actuator and a position sensor for detecting a position of the actuator are fixed at a predetermined position within a movable range of the robot.

6. The robot system according to claim 1, wherein the control device further comprises an execution unit that performs at least one of stopping the robot with an alarm and recording at least one of a current position and a posture of the robot, a current position of the actuator when the actuator reaches an upper limit value or a lower limit value of a movable range of the actuator.

7. The robot system according to claim 1, wherein the control device further comprises a replacement unit that replaces the predetermined motion trajectory of the robot with a corrected motion trajectory of the robot corrected according to the position correction amount calculated by the position correction unit.

8. The robot system according to claim 1, wherein the force detection unit is mounted on the wrist unit of the robot.

9. The robot system according to claim 1, wherein the force detection unit is fixed at a predetermined position within the movable range of the robot.

* * * * *